July 24, 1934.   J. W. FRANKE ET AL   1,967,998
VEHICLE LOCKING DEVICE
Filed April 12, 1933
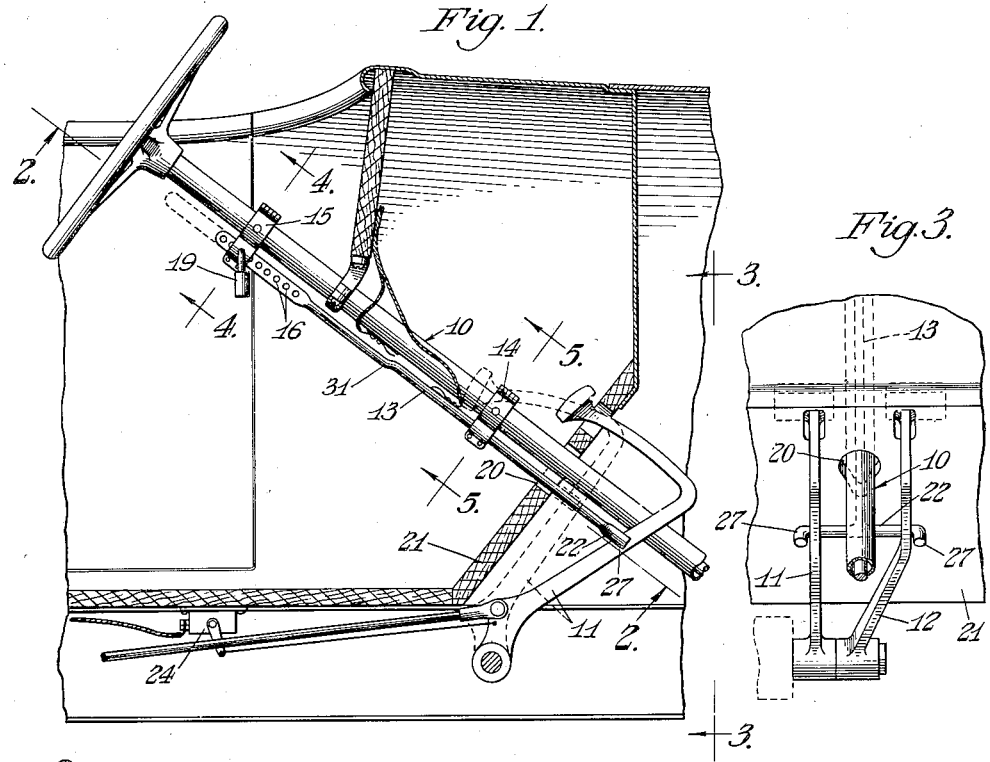
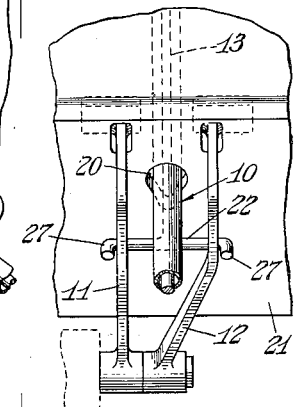
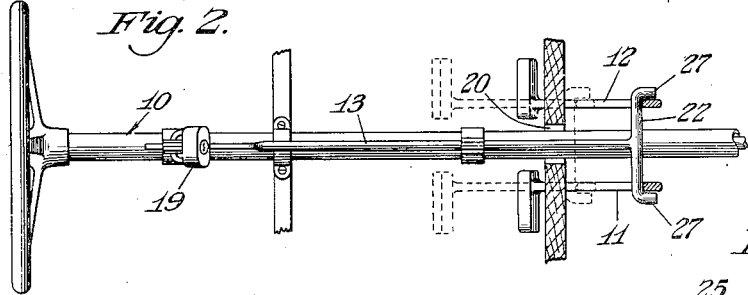
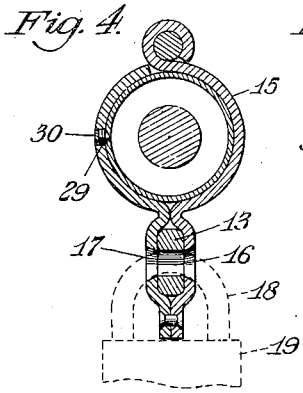 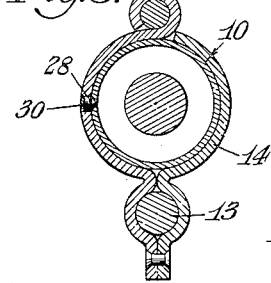 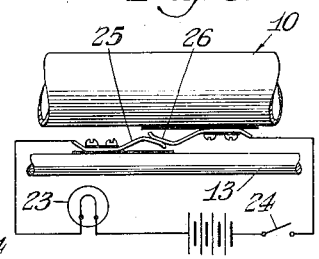
James W. Franke &
Louis Palmiotta.
INVENTORS
BY Victor J. Evans & Co.
THEIR ATTORNEYS Patented July 24, 1934

1,967,998

UNITED STATES PATENT OFFICE 1,967,998

VEHICLE LOCKING DEVICE

James W. Franke and Louis Palmiotta, Chicago, Ill.

Application April 12, 1933, Serial No. 665,799

1 Claim. (Cl. 70—126)

This invention relates to certain novel improvements in vehicle locking devices.

An object of this invention is to provide a simple, inexpensive, and effective device for locking the clutch and brake pedals or levers of an automotive vehicle to prevent operation of the same and thereby prevent unauthorized use of the vehicle.

Another object of the invention is to construct the device so that it will not interfere with the normal operation of the clutch and brake pedals by the driver of the vehicle.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a side elevational view of a preferred form of the new device;

Fig. 2 is a bottom plan view of the same on line 2—2 in Fig. 1;

Fig. 3 is an end elevational view on line 3—3 in Fig. 1;

Fig. 4 is a sectional view on line 4—4 in Fig. 1;

Fig. 5 is a sectional view on line 5—5 in Fig. 1; and

Fig. 6 is a view, partly in elevation and partly schematic, illustrating the arrangement of the stop signal circuit associated with the locking rod and brake pedal in the new device.

In the drawing 10 indicates the steering column of an automotive vehicle and 11 and 12 the brake and clutch pedals, respectively.

The new locking device includes a locking rod 13 that is slidably mounted on the steering column 10 by means of brackets 14 and 15. At its upper end the locking rod 13 has a series of spaced openings 16 formed therein for selective registration with an opening 17 formed in the bracket 15 (Fig. 4). To lock the rod the bolt 18 of a padlock 19 is inserted through the registered openings 13 and 17.

The locking rod 13 is slidably projected through an opening 20 in the floor board 21 of the vehicle and has at its lower end, below the floor board 21, a T-shaped head 22 which is adapted to engage simultaneously the brake and clutch pedals or levers 11 and 12, as shown.

To lock the vehicle against unauthorized movement the locking rod 13 is slid downwardly (Fig. 1), whereupon the head 22 thereof engages the brake and clutch pedals 11 and 12 below the floor board 21 and forces the pedals 11 and 12 down into full line position, Fig. 1. The bolt 18 of the lock 19 is then inserted through a preselected aperture 16 in the rod 13 and through the aperture 17 registered therewith to hold the locking rod 13 and the brake and clutch pedals 11 and 12 in locked position.

Since the head 22 engages the pedals 11 and 12 below the floor board 21 the device does not interfere with the free operation of the pedals by the operator of the vehicle. This is an important feature of the new locking device and is considered a distinct improvement over the prior art devices since in all of the latter with which we are familiar the engagement of the locking rod with the brake and clutch pedals 11 and 12 is above the floor board 21 and interferes with the free operation of the brake and clutch pedals by the operator, and interferes with the movement of the operator's feet in controlling the pedals.

There is an offset 31 in the locking rod 13 which slides under the steering column to clear any bracket that supports the panel from the steering column. It is now customary in automotive vehicles to provide a stop light signal 23 at the rear of the vehicle and to control this signal by a switch 24 operable from the brake pedal 11. This switch is closed when the brake pedal is depressed. So as to open the circuit (Fig. 6) to the stop signal 23 when the locking rod 13 and brake pedal 11 are depressed we provide on the locking rod 13, in the circuit to the stop signal 23, a movable contact 25 which engages a stationary contact 26 on the steering column 10 when the locking rod 13 is raised but which is disengaged from the stationary contact 26 when the locking rod 13 is depressed.

The head 22 has arms 27 which embrace the sides of the pedals 11 and 12 when the locking rod 13 is depressed. These arms 27 prevent the locking rod 13 from being rotated in an unauthorized attempt to move the vehicle since any attempted rotatable manipulation of the rod 13 will engage the arms 27 against the pedals 11 and 12 and prevent further movement thereof.

Set screws 28 and 29 carried by the brackets or clamps 14 and 15, respectively, have their inner ends embedded in the steering column 10 and prevent removal of these brackets from the steering column. These set screws are concealed by plugs 30 which prevent removal of the set screws from the clamps and therefore the clamps from the steering column.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claim.

Having thus described our invention what we claim as new and desire to protect by Letters Patent is:

In a locking mechanism for motor vehicles, in combination with a steering column and the brake and clutch pedals of a motor vehicle, a bracket mounted on the upper end portion of the steering column having an aperture formed therein, a locking rod slidably mounted on the steering column including an end portion slidably mounted in said bracket having a series of spaced apertures formed therein selectively registrable with said bracket aperture, said rod having a T-shaped head at its lower end engageable simultaneously with the said brake and clutch pedals below the floor board of the vehicle by manipulation of the said locking rod in a downward direction, and a lock having a bolt for insertion through said bracket aperture and through a preselected one of said locking rod apertures to hold the said pedals in depressed locked position.

JAMES W. FRANKE.
LOUIS PALMIOTTA.